(12) United States Patent
Pazur et al.

(10) Patent No.: US 6,872,780 B2
(45) Date of Patent: Mar. 29, 2005

(54) BUTYL POLYMER COMPOSITION HAVING IMPROVED COLD FLOW PROPERTIES

(75) Inventors: Richard Pazur, Sarnia (CA); Anthony J. Sumner, South Hampton (GB)

(73) Assignees: Bayer Inc., Sarnia (CA); Bayer Aktiengesellschaft, Leverkusen (DE)

( * ) Notice: Subject to any disclaimer, the term of this patent is extended or adjusted under 35 U.S.C. 154(b) by 152 days.

(21) Appl. No.: 10/333,566

(22) PCT Filed: Jul. 24, 2001

(86) PCT No.: PCT/CA01/01064

§ 371 (c)(1),
(2), (4) Date: Jan. 23, 2003

(87) PCT Pub. No.: WO02/10277

PCT Pub. Date: Feb. 7, 2002

(65) Prior Publication Data

US 2004/0092665 A1 May 13, 2004

(30) Foreign Application Priority Data

Jul. 27, 2000 (CA) .......................................... 2315830

(51) Int. Cl.[7] .................. C08L 23/00; C08L 23/04; C08L 27/00; C08L 33/14; C08L 39/04
(52) U.S. Cl. .................. 525/191; 525/203; 525/213; 525/214; 525/215; 525/232; 525/241

(58) Field of Search ................. 525/191, 203, 525/213, 214, 215, 232, 241

(56) References Cited

U.S. PATENT DOCUMENTS

| | | | | |
|---|---|---|---|---|
| 4,284,535 A | * | 8/1981 | Lal et al. ..................... | 525/191 |
| 4,487,892 A | * | 12/1984 | Ohmori et al. ............. | 525/237 |
| 4,754,793 A | * | 7/1988 | Mohammed ................. | 152/510 |
| 5,532,312 A | * | 7/1996 | Gursky et al. .............. | 525/232 |
| 5,886,106 A | | 3/1999 | Sumner et al. ........... | 515/332.8 |
| 6,399,710 B1 | * | 6/2002 | Finerman et al. ........... | 525/232 |

FOREIGN PATENT DOCUMENTS

| | | |
|---|---|---|
| EP | 0 296 332 | 12/1988 |

* cited by examiner

*Primary Examiner*—Nathan M. Nutter
(74) *Attorney, Agent, or Firm*—Joseph C. Gil; Jennifer R. Seng (57) ABSTRACT

A butyl polymer composition having improved cold flow properties is described. The composition comprises a butyl polymer (preferably a halogenated butyl polymer) and a styrene monomer. The styrene monomer is a copolymer of α-methylstyrene and another styrenic monomerer (e.g., styrene and vinyl toluene). Relative to the base butyl polymer, the cold flow properties of the butyl polymer composition are improved along with a number of other properties.

27 Claims, 14 Drawing Sheets

BUTYL POLYMER COMPOSITION HAVING IMPROVED COLD FLOW PROPERTIES

FIELD OF THE INVENTION

In one of its aspects, the present invention relates to a butyl polymer composition having improved cold flow properties. In another of its aspects, the present invention relates to a process for producing a butyl rubber vulcanizate having a desirable balance of properties, including improved air impermeability.

BACKGROUND OF THE INVENTION

Butyl polymers have been known and commercially available for many years. They possess a variety of inherently satisfactory properties as elastomers which has enabled them to find utility in many commercial areas. Among their satisfactory inherent properties are their impermeability to air, high damping of low frequency vibrations and good resistance to aging, heat, acids, bases, ozone and other chemicals, after vulcanization. These properties render butyl polymers well suited for use in a variety of applications including articles requiring low or reduced permeability to air. Non-limiting examples of such applications include tire inner tubes, tire curing bladders and various air bladders.

Halogenated butyl polymers have also been known and commercially available for many years. In addition to possessing the satisfactory inherent properties of butyl polymers described above, halogenated butyl polymers also possess cure compatibility with more highly unsaturated rubbers and good adhesion to such other rubbers after vulcanization, which renders them well suited for use in pneumatic tire inner liners.

Despite the advances made in the art to date, there is still room for improvement.

One of the properties of butyl rubber which is commercially important is resistance to cold flow. Specifically, users of butyl rubber typically will calendar the polymer into continuous very long sheets. In some cases, the polymer may be premixed with one or more of a filler (e.g., carbon black), a plasticizer, a tackifier, an extender oil and the like—such a composition may be characterized as a vulcanizable composition.

Once the calendar sheets are produced, it is quite common to reversibly fold or "wig-wag" the sheets on a pallet such that the height of the folded sheet is a number of feet. If the vulcanizable composition is susceptible to cold flow during shipping or storage, the weight of the folded polymer sheet causes the surface coating of the sheet (particularly at the bottom of the pile) to break, allowing adjacent fresh surfaces to contact, which leads to sticking of the sheets. This problem is exacerbated during long transportation or storage times, and/or high ambient temperatures. By the time the vulcanizable composition is ready for further processing it is more difficult to remove as a single sheet compared to the manner in which it was placed on the pallet.

While this can be alleviated, to some extent, by putting less polymer on a pallet, this increases the number of pallets required to transport or store a given amount of vulcanizable composition, thereby increasing costs.

U.S. Pat. No. 4,754,793 (Mohammed) teaches butyl elastomer compositions having reduced permeability to gases. Specifically, there is taught a rubber composition comprising a butyl polymer, an α-methylstyrene homopolymer, carbon black in a curing system, and optionally, a hydrocarbon extender oil. Mohammed fails to teach or suggest any effect on cold flow properties of the butyl polymer conferred by the addition of the α-methylstyrene homopolymer.

Further, to the knowledge of the inventors, α-methylstyrene homopolymer is not available in quantities commercially significant to be used as an additive in butyl polymer compositions. The principal reason may be attributed to a toughening of environment laws which had the effect of making it impractical to produce large quantities of the material for use as an additive as contemplated by Mohammed. Accordingly, while the teachings of Mohammed are useful, the commercial significance thereof is restricted somewhat by the unavailability of significant commercial quantities of α-methylstyrene homopolymer.

It would be desirable to have a butyl polymer composition having improved cold flow properties and a desirable balance of other properties, such as air impermeability, green strength and processability.

It is the object of the present invention to provide a novel butyl polymer composition having improved cold flow properties.

It is another objection of the present invention to provide a novel process for producing a butyl polymer vulcanizate.

SUMMARY OF THE INVENTION

Accordingly, in one of its aspects, the present invention provides a butyl polymer composition having improved cold flow properties, the composition comprising a butyl polymer and a styrene resin, the styrene resin comprising a first copolymer of α-methylstyrene and another styrenic monomer.

Thus, it has been discovered that the use of a styrene resin which is a copolymer of α-methylstyrene and another styrenic monomer has advantageous results when used as an additive in a butyl polymer composition. Specifically, it has been unexpectedly and surprisingly discovered that the use of such an additive results in the following improvements to the butyl rubber composition and/or a vulcanizate produced therefrom:

increase in green strength of butyl polymer;

reduction in cold flow of the butyl polymer composition;

decrease in the tendency of the butyl polymer composition to adhere to metal; and desirable mechanical properties in the vulcanizate produced from the butyl polymer composition.

These advantages are seen without significantly compromising other important properties of the butyl polymer composition and vulcanizates produced therefrom.

BRIEF DESCRIPTION OF THE DRAWINGS

Embodiments of the present invention will be described with reference to the accompanying drawings in which.

DETAILED DESCRIPTION OF THE INVENTION

As mentioned hereinabove, an aspect of the present invention relates to a butyl polymer composition.

One component of the present butyl polymer composition is a butyl polymer.

The terms "butyl polymer", "butyl rubber" and "butyl rubber polymer" are used interchangeably throughout this specification and are intended to mean a polymer prepared by reacting a major portion of an isoolefin monomer with a minor portion of a multiolefin monomer.

Preferably, the butyl polymer comprises a copolymer of a $C_4$ to $C_8$ monoolefin monomer and a $C_4$ to $C_{14}$ multiolefin monomer.

The preferred $C_4$ to $C_8$ monoolefin comprises an isomonoolefin. Non-limiting examples of useful monoolefin monomers may be selected from the group comprising isobutylene, 2-methyl-1-butene, 3-methyl-1-butene, 2-methyl-2-butene, 4-methyl-I-pentene and mixtures thereof.

The preferred $C_4$ to $C_{14}$ multiolefin comprises a $C_4$ to $C_{10}$ conjugated diolefin. Non-limiting examples of useful conjugated diolefins may be selected from the group comprising isoprene, butadiene, 2,4-dimethylbutadiene, piperyline, 3-methyl-1,3-pentadiene, 2,4-hexadiene, 2-neopentyl-1,3-butadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof.

The butyl polymer may be derived from a mixture comprising from about 70 to about 99.5 parts by weight of the $C_4$ to $C_8$ monoolefin monomer and from about 30 to about 0.5 parts by weight of the $C_4$ to $C_{14}$ multiolefin monomer. More preferably, the butyl polymer is derived from a mixture comprising from about 80 to about 99.5 parts by weight of the $C_4$ to C8 monoolefin monomer and from about 20 to about 0.5 parts by weight of the $C_4$ to $C_{14}$ multiolefin monomer.

The most preferred butyl polymer for use in the present butyl polymer composition is derived from a mixture comprising from about 97 to about 99.5 parts by weight of isobutylene and from about 3 to about 0.5 parts by weight of isoprene.

The manner of producing the butyl polymer useful herein is not particularly restricted and is within the purview of a person skilled in the art.

Those of skill in the art will recognize that it is possible to include an optional third monomer to produce a butyl terpolymer. For example, it is possible to include a styrenic monomer in the monomer mixture, preferably in an amount up to about 15 percent by weight of the monomer mixture. The preferred styrenic monomer may be selected from the group comprising p-methylstyrene, styrene, α-methylstyrene, p-chlorostyrene, p-methoxystyrene, indene, indene derivatives and mixtures thereof. The most preferred styrenic monomer may be selected from the group comprising styrene, p-methylstyrene and mixtures thereof. Other suitable copolymerizable termonomers will be apparent to those of skill in the art.

A particularly preferred class of butyl polymers for use in the present butyl polymer composition is the class of halogenated butyl polymers, particularly chlorinated butyl polymers and brominated butyl polymers.

Preferably, the halogenated butyl polymer comprises a halogen in the amount of from about 0.1 to about 8% by weight of the polymer. More preferably, the halogenated butyl polymer comprises a halogen in the amount of from about 0.5 to about 4% by weight of the polymer. Most preferably, the halogenated butyl polymer comprises a halogen in the amount of from about 1.5 to about 3.0% by weight of the polymer.

The halogenated butyl polymer may be produced by halogenating a previously produced butyl polymer in a conventional manner. See, for example, U.S. Pat. No. 5,886,106. Thus, the halogenated butyl rubber may be produced either by treating finely divided butyl rubber with a halogenating agent, such as chlorine or bromine, preferably bromine, or by producing brominated butyl rubber by the intensive mixing, in a mixing apparatus, of brominatiug agents such as N-bromosuccinimide with a previously made butyl rubber. Alternatively, the halogenated butyl rubber may be produced by treating a solution or a dispersion in a suitable organic solvent of a previously made butyl rubber with corresponding brominating agents. See, for more detail, Ullmann's Encyclopedia of Industrial Chemistry (Fifth, Completely Revised Edition, Volume A23; Editors Elvers et al.). The amount of halogenation during this procedure may be controlled so that the final polymer has the preferred amounts of halogen described hereinabove.

Another component of the present butyl polymer composition is a styrene resin comprising a first copolymer of α-methylstyrene and another styrenic monomer.

Preferably, the other styrenic monomer is selected from the group comprising styrene, vinyl styrene, p-methylstyrene (vinyl toluene), p-chlorostyrene, p-methoxystyrene, indene, indene derivatives and mixtures thereof. The most preferred styrenic monomer may be selected from the group comprising styrene, p-methylstyrene and mixtures thereof. Copolymers of α-methylstyrene and such styrenic monomers are known and thus are within the purview of a person skilled in the art.

A copolymer of α-methylstyrene and styrene useful in the present invention is commercially available from Hercules Inc. under the tradename Kristalexg® 1120.

A copolymer of α-methylstyrene and vinyl toluene useful in the present is commercially available from Hercules Inc. under the tradename Piccotex® 120.

Preferably, the styrene resin is present in an amount of up to about 25 parts by weight per hundred parts by weight butyl polymer. More preferably, the styrene resin is present in an amount in the range of from about 5 to about 20 parts by weight per hundred parts by weight butyl polymer. Even more preferably, the styrene resin is present in an amount in the range of from about 5 to about 15 parts by weight per hundred parts by weight butyl polymer. Most preferably, the styrene resin is present in an amount in the range of from about 10 to about 15 parts by weight per hundred parts by weight butyl polymer.

Preferably, the present butyl polymer composition further comprises a filler. The nature of the filler is not particularly restricted, and the choice of suitable fillers is within the purview of a person skilled in the art. Non-limiting examples of suitable fillers include carbon black (e.g., FEF, MT, GPF and SRF), clays, titanium dioxide, silica fillers (with or without unsaturated silanes), calcium carbonate, talc (magnesium silicate) and the like. The amount of filler is conventional. Preferably, the filler is present in an amount in the range of from about 20 to about 200 parts by weight per hundred parts by weight of the polymer. More preferably, the filler is present in an amount in the range of from about 20 to about 100 parts by weight per hundred parts by weight of the polymer. Most preferably, the filler is present in an amount in the range of from about 40 to about 80 parts by weight per hundred parts by weight of the polymer.

The present butyl polymer composition may further comprise a hydrocarbon extender oil. The use of hydrocarbon extender oils, is well known in the art. Suitable hydrocarbon extender oils include the paraffinic or naphthenic extender oils, preferably paraffinic. Also known in the art is that the use of such extender oils in butyl rubber vulcanizates generally causes the air permeability of such vulcanizates to increase. Thus, if used in the present butyl polymer composition, such hydrocarbon extender oils should be present in minor amounts. Preferably, the oil(s) is present in an amount of from 0 to about 7, preferably from 0 to about 4, parts by weight per hundred parts by weight butyl polymer in the composition.

The present butyl polymer composition may further comprise a curing system. The choice of curing system suitable for use is not particularly restricted and is within the purview of a person skilled in the art. A typical curing system comprises: (i) a metal oxide, (ii) elemental sulfur and (iii) at least one sulfur-based accelerator. The use of metal oxides as a component in the curing system is well known in the art. A suitable metal oxide is zinc oxide, which is typically used in the amount of from about 1 to about 10, preferably from about 2 to about 5, parts by weight per hundred parts by weight butyl polymer in the composition. Elemental sulphur, comprising component (ii) of the preferred curing system is typically used in amounts of from about 0.2 to about 2 parts by weight, per hundred parts by weight butyl polymer in the composition. Suitable sulfur-based accelerators (component (iii) of the preferred curing system) are typically used in amounts of from about 0.5 to about 3 parts by weight, per hundred parts by weight butyl polymer in the composition. Non-limiting examples of useful sulfur-based accelerators may be selected from the thiuram sulfides such as tetramethyl thiuram disulfide (TMTD), the thiocarbamates such as zinc dimethyl dithiocarbamate (ZDC) and the thiazyl and benzothiazyl compounds such as mercaptobenzothiazyl disulfide (MBTS). Preferably, the sulphur based accelerator is mercaptobenzothiazyl disulfide.

Stabilizeis, anti-oxidants and tackifiers may also be added in the usual way and in the normal amounts for compounding butyl-type rubbery polymers.

The procedure of mixing the various components of this invention is not specifically restricted. In one embodiment, all of the ingredients of the rubber composition described above may be mechanically mixed at an initial temperature of not more than about 80° C. in an internal mixer and then vulcanized in a conventional manner. In another embodiment, the butyl polymer and styrene resin may be solution blended, the blend recovered from solution prior to being mechanically mixed with the remaining ingredients and then vulcanized in a conventional manner. Thus, a blend of a butyl polymer and styrene resin is suitably achieved using solutions of the polymers in mutually compatible hydrocarbon liquid solvents. Such a blend may be recovered from solution by standard recovery techniques of solvent removal and drying, followed by the compounding and vulcanization procedure described above. In yet another embodiment, the styrene resin may be added, in bulk, to the butyl polymer during a final stage of the manufacturing process of the latter.

Generally, it is preferred to carry out the compounding procedure in two stages.

In the first stage the polymers may be mixed with conventional compounding ingredients such as one or more of carbon black, hydrocarbon extender oil, tackifiers, stabilizers, processing aids and anti-oxidants. This results in the production of a vulcanizable composition which can be transported, stored and/or vulcanized.

In the second stage of the compounding procedure, vulcanization is carried out. Specifically, one or more curatives are preferably added to the vulcanizable composition prepared in the first stage of compound. Practically, this can be carried out on a rubber mill or in an internal mixer operated at a temperature normally not in excess of about 60° C. The curative may be selected from the group comprising elemental sulphur, accelerators, zinc oxide and mixtures thereof.

After addition of the curative(s), the vulcanizable composition may be cured in a conventional manner, for example, by heating for from about 5 to about 60 minutes at temperatures of from about 150° C. to about 200° C. to form elastomeric vulcanizates.

Embodiments of the present invention will be illustrated with reference to the following Examples, which should not be use to construe or limit the scope of the present invention.

In the Examples, the following materials were used:
BB 2030: a brominated butyl rubber having a halogen content of about 2.0% by weight, commercially available from Bayer Inc. under the tradename POLYSAR® Bromobutyl 2030;

N-660: carbon black commercially available from Sterling-V;

Sunpar 2280: paraffinic oil commercially available from Sun Refining & Marketing Co.;

HCR #1: α-methylstyrene-styrene copolymer (Mw=2950; Tg=56° C.; softening point=120° C.) commercially available from Hercules Inc. under the tradename Kristalex® 1120;

HCR #2: α-methylstyrene-vinyl toluene copolymer (Mw=3800; Tg=68° C.; softening point=118° C.) commercially available from Hercules Inc. under the tradename Piccotex®g 120;

Pentalyn "A": a pentaerythritol ester of rosin, used as a tackifier;

Stearic acid: used as an activator/processing aid;

MBTS: mercaptobenzothiazyl disulfide, used as an accelerator, commercially available under the tradename Vulcacit™ DMIC;

sulfur: curative; and

ZnO: zinc oxide, used as a vulcanization agent, commercially available under the tradename Kadoxm™ 920.

Unless otherwise stated in the Examples, the amounts of ingredients are expressed in parts by weight.

EXAMPLES 1–3

The recipes for the bromobutyl rubber compositions used in these Examples is set out in Table 1. As will be appreciated by those of skill in the art, Example 1 contains no styrene resin and, thus, this Example is provided for comparative purposes only. In Examples 2 and 3, the extender oil used in Example 1 has been substituted for by the specified styrene polymers.

Figure 1:
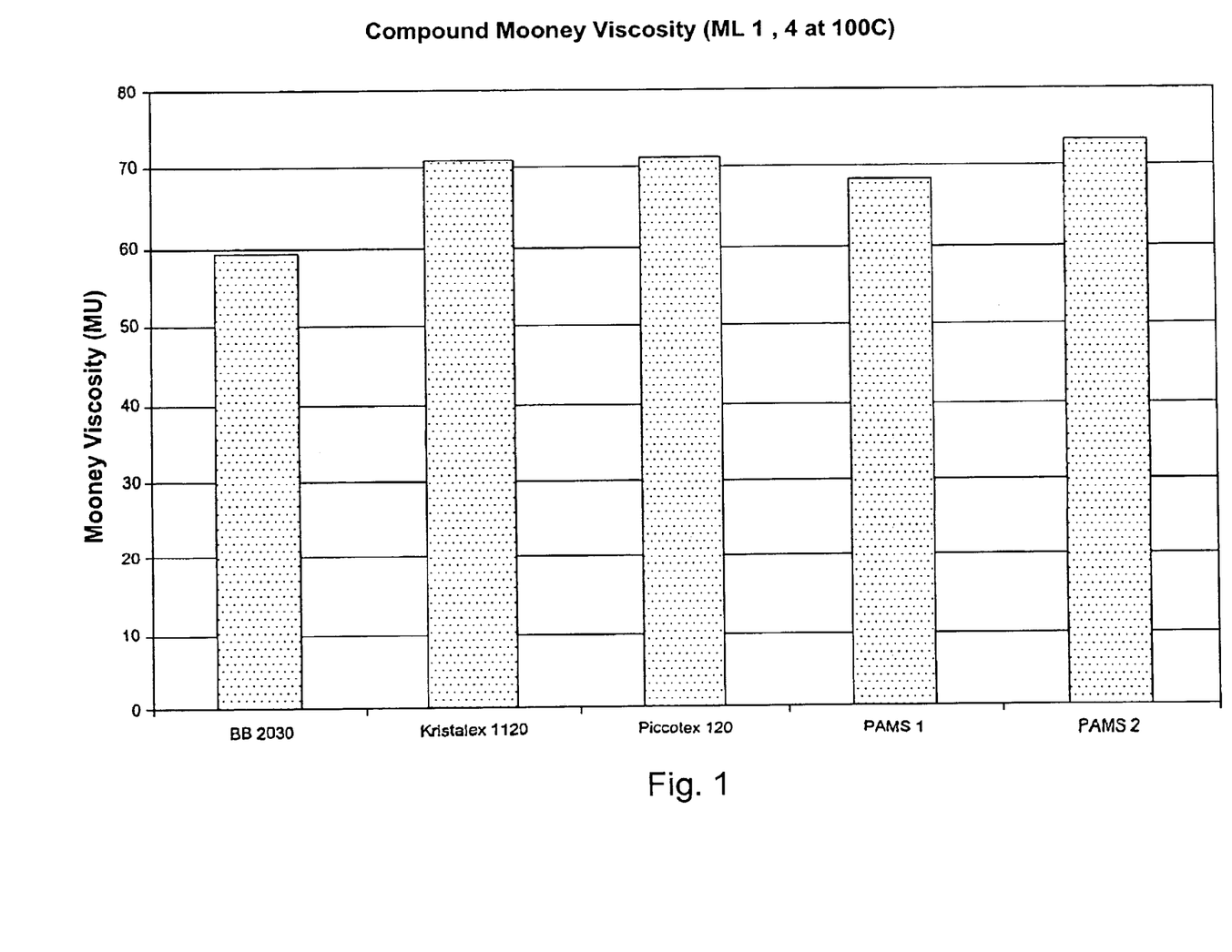
FIGS. 1–14 illustrate various physical properties of polymer compositions and of vulcanizates derived therefrom produced in the Examples set out below.
Figure 2:
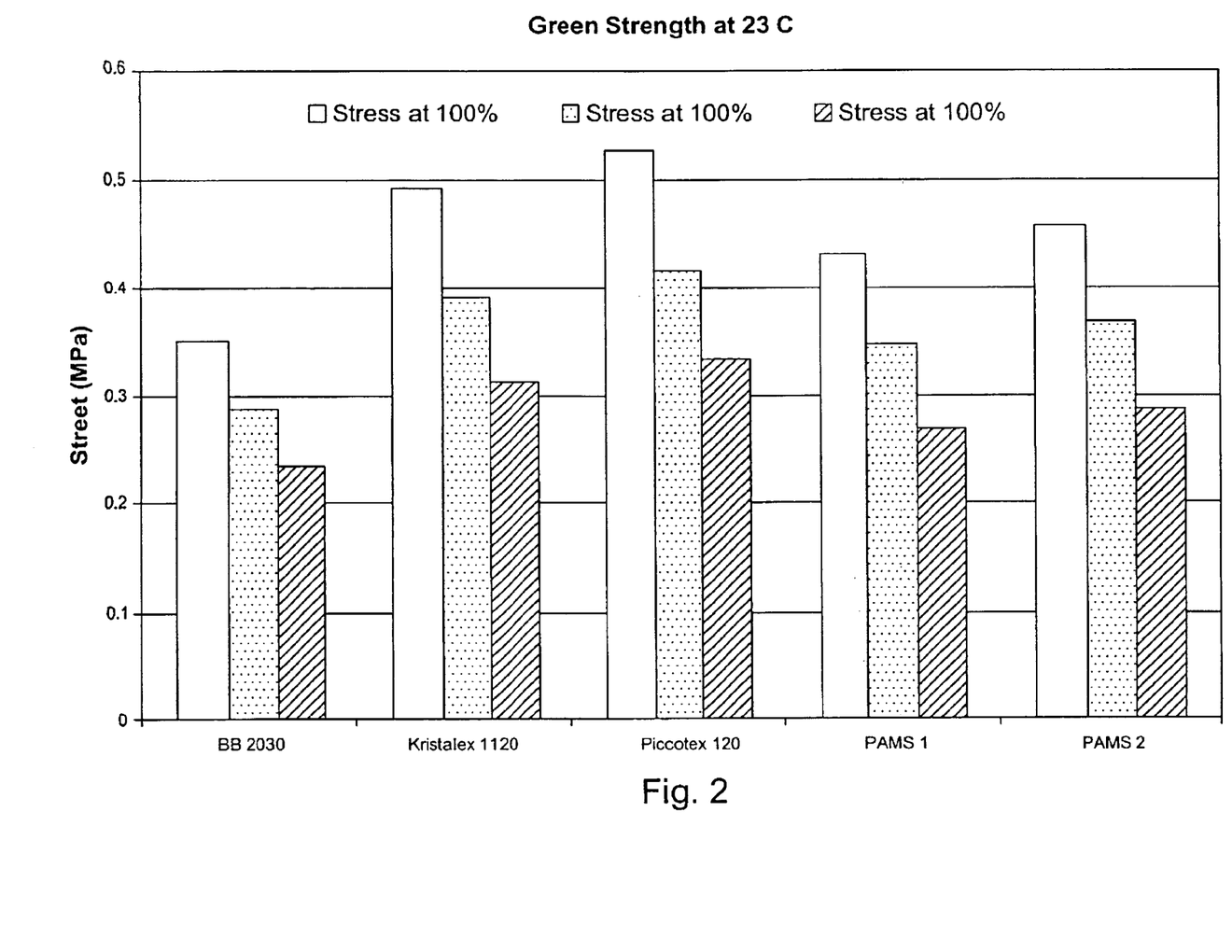
Figure 3:
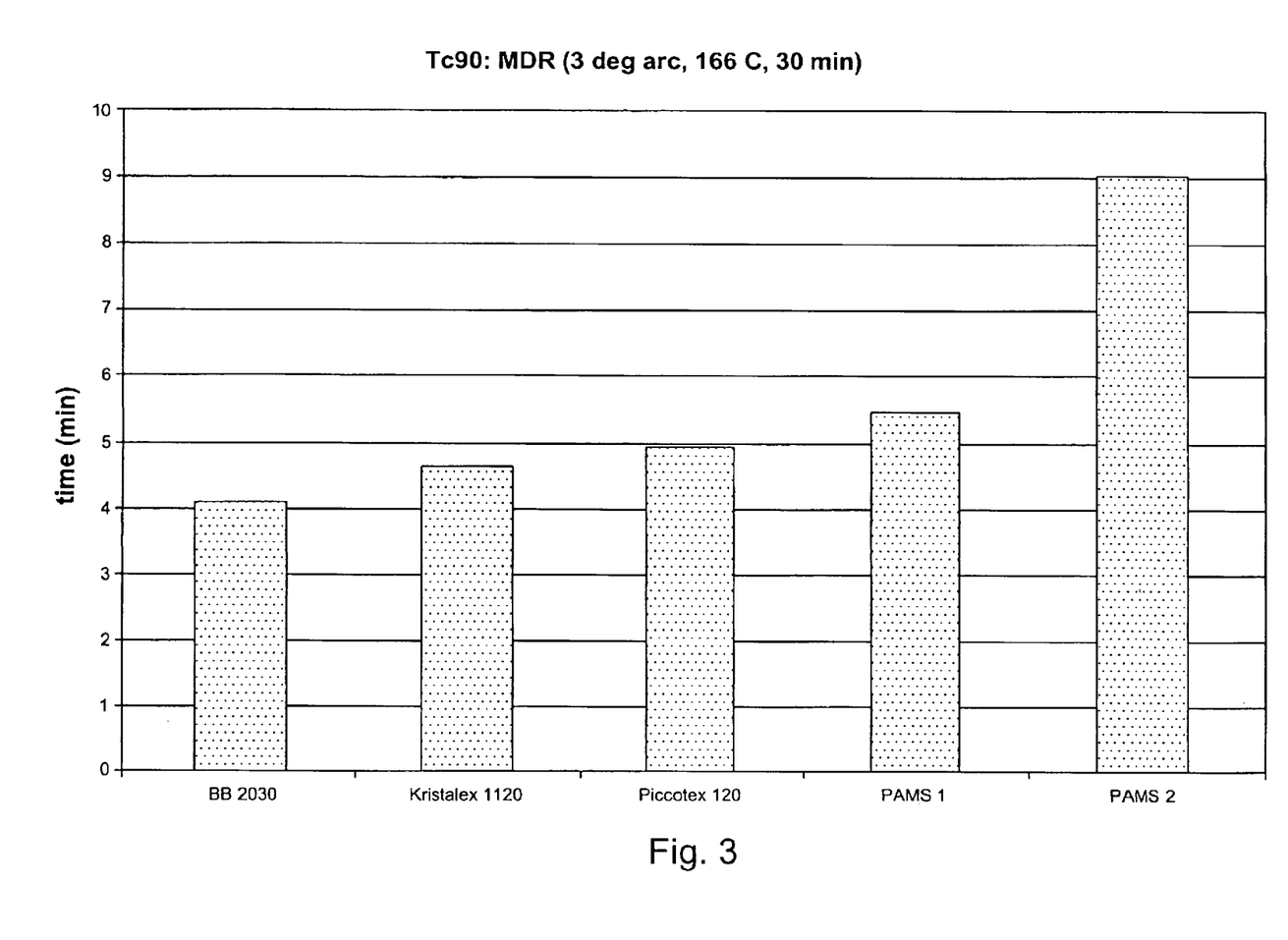

All ingredients except the sulfur and the zinc oxide were mixed in a Banbury mixer for 3 minutes. The reaction mixture was cooled, the temperature of the cooling water being approximately 30° C. Thereafter, the mixture was transferred to a cool 10"x 20"mill. The sulfuir and zinc oxide were added and the resulting mixture was milled until the additives were incorporated. At this point, the following unvulcanized properties of the mixture were measured and the results illustrated in the Figures specified:

Compound Mooney viscosity (ML 1, 4 @ 100° C.)—FIG. 1;

Green Strength @ 23° C.—FIG. 2; and

Cure Rate—FIG. 3.

Figure 4:
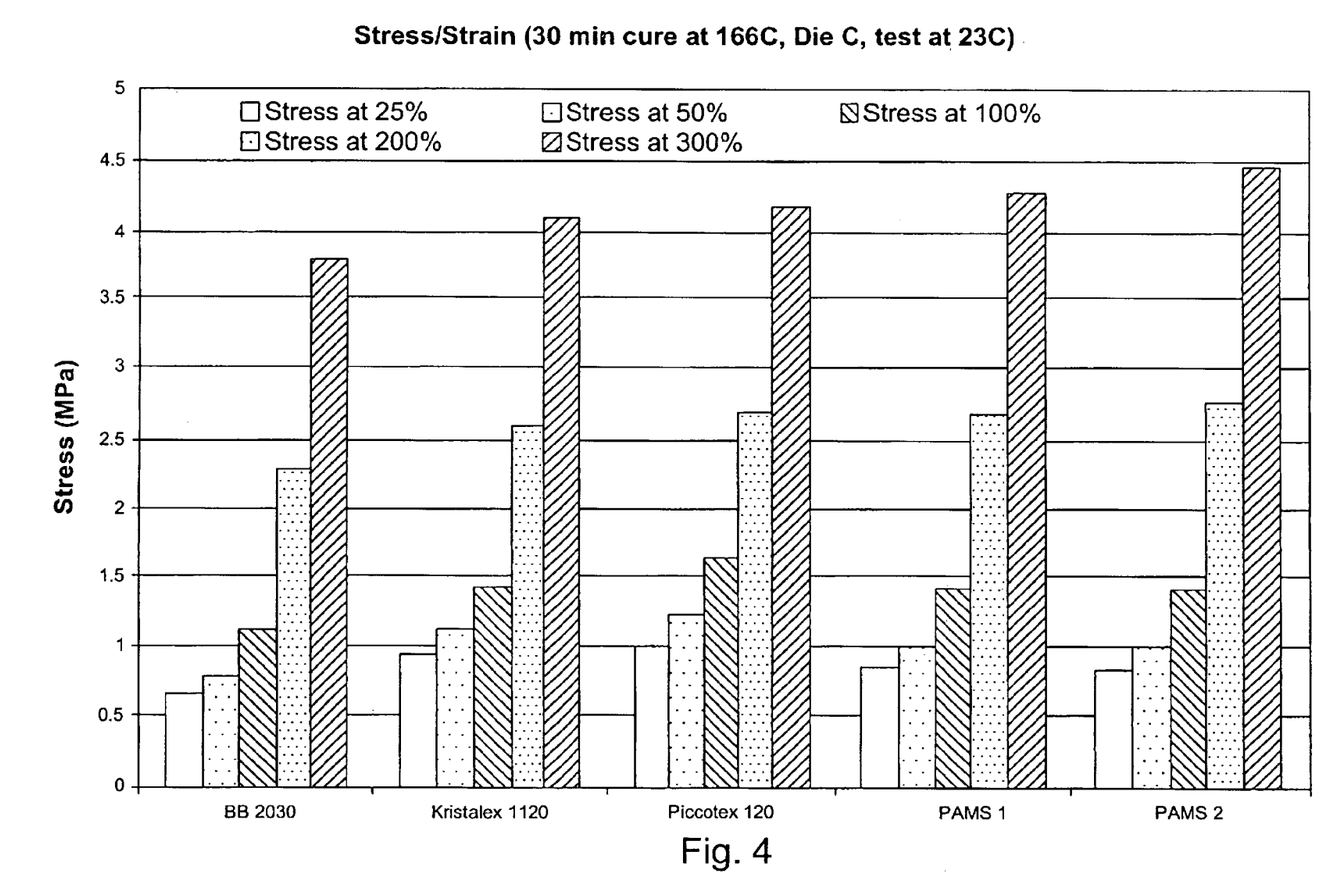
Figure 5:
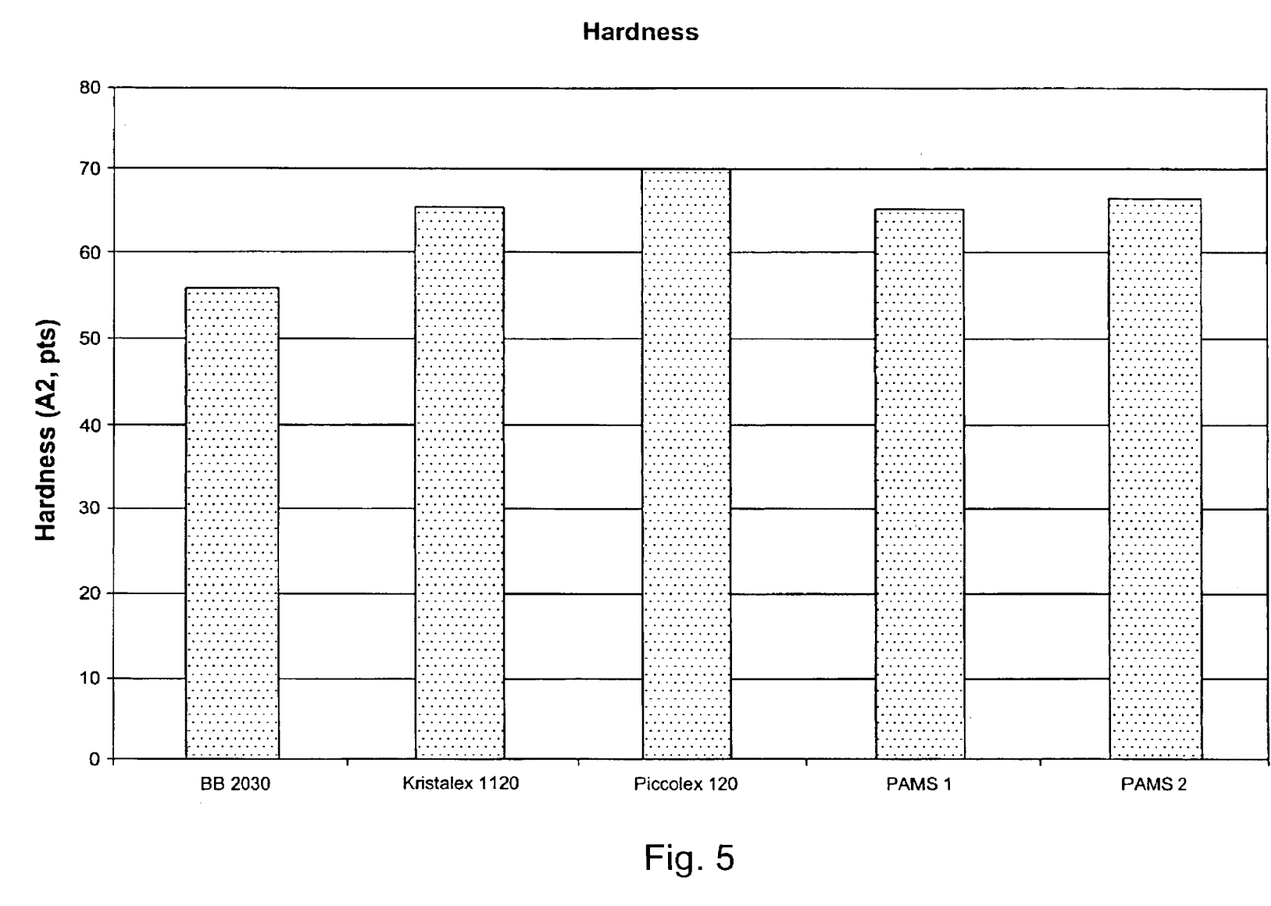
Figure 6:
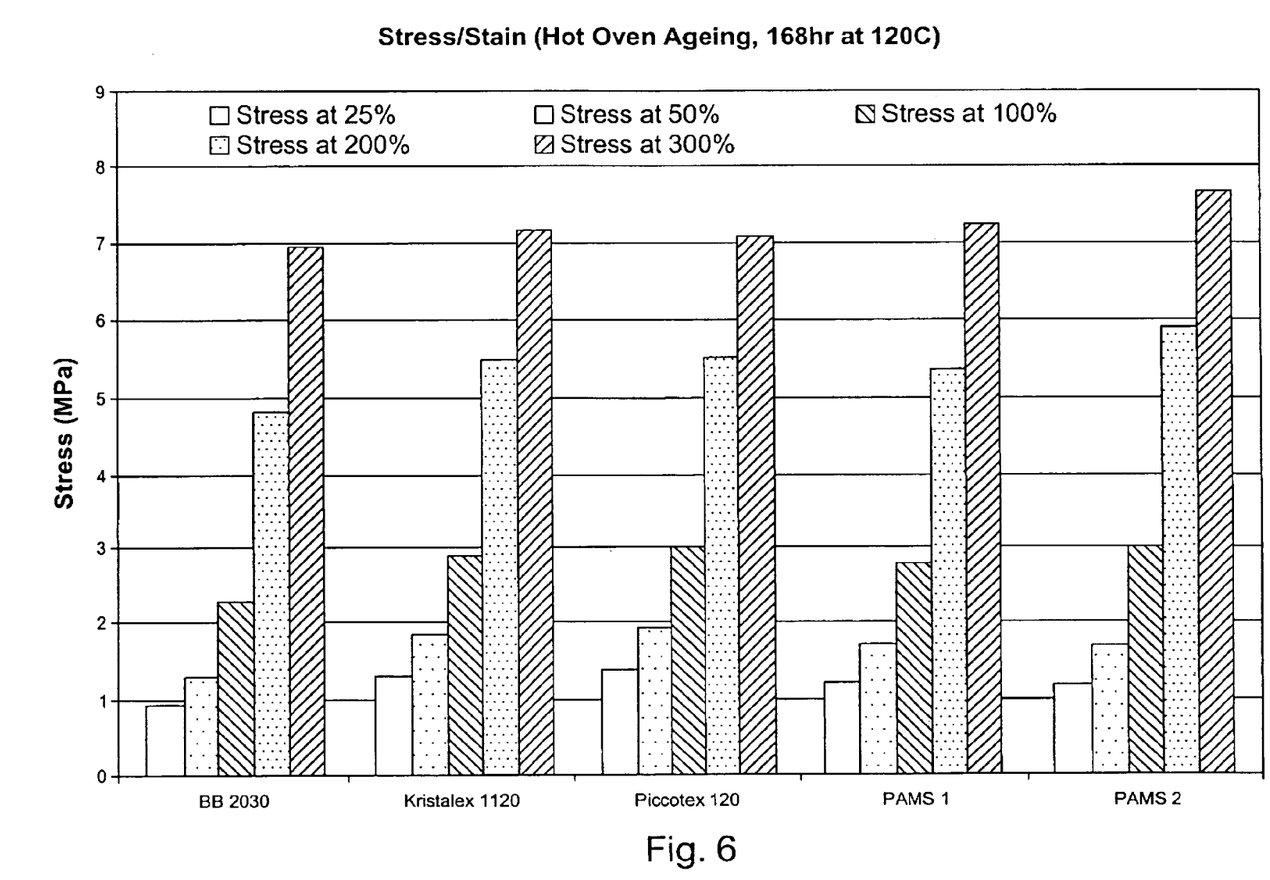
Figure 7:
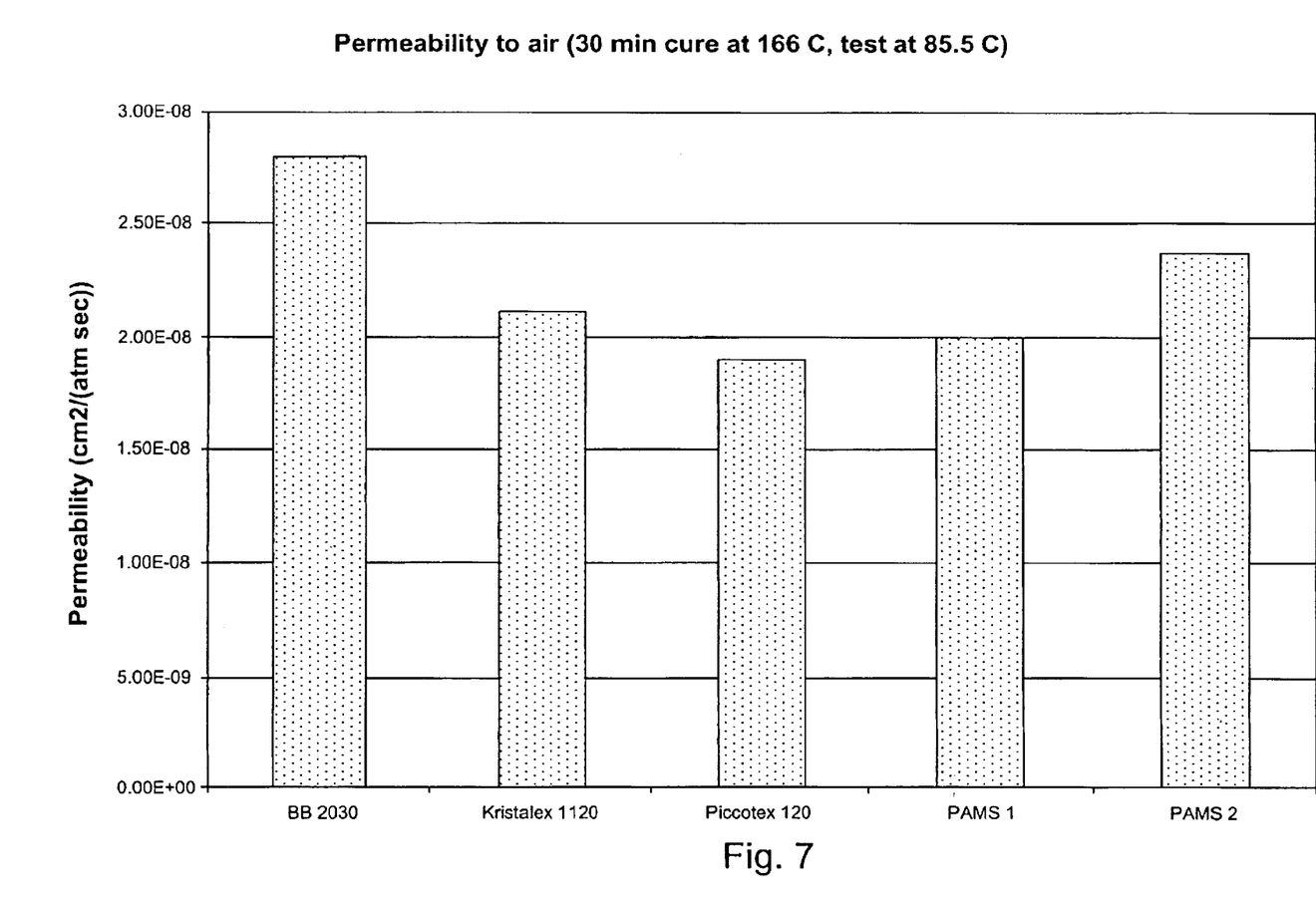

Thereafter, the vulcanizable mixture was cured at 166° C. for a period of 30 minutes. The following properties of the vulcanizate were measured and the results illustrated in the Figures specified:

Stress/Strain (Die C, test @ 23° C.) FIG. 4;

Hardness (Shore A)—FIG. 5;

Stress/Strain (hot oven aging: 168 hr. @ 120° C.)—FIG. 6;

Permeability to air (test @ 65.5° C.)—FIG. 7; and

Figure 8:
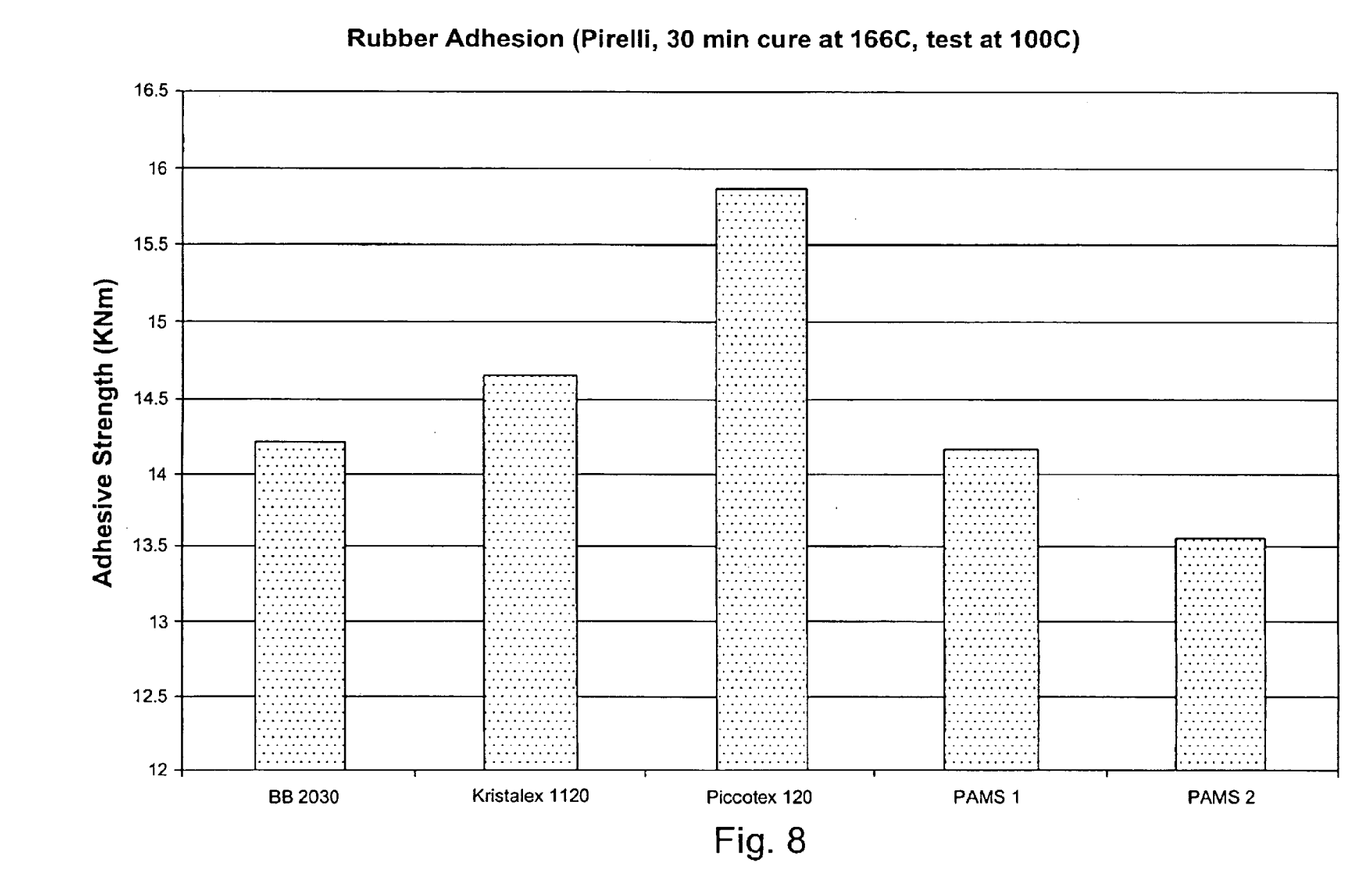

Rubber Adhesion test—FIG. 8.

With reference to FIG. 1, it will be seen that there is a slight increase in the Mooney viscosity when the styrene polymer is added to the butyl polymer composition. This is within acceptable limits.

With reference to FIG. 2, it will be seen that the green strength of the butyl polymer composition of Examples 2 and 3 is much better than that of Example 1 —in effect this is the same as an improvement in the cold flow properties of the butyl polymer composition.

With reference to FIG. 3, it will be seen that the cure rate (time to 90% cure) is approximately the same for the butyl compositions of Examples 2 and 3 compared to that of Example 1.

With reference to FIG. 4, it will be seen that the stress/strain property of the butyl polymer composition of Examples 2 and 3 is were increased slightly compared to that of Example 1.

With reference to FIG. 5, it will be seen that the hardness of vulcanizates made from the butyl polymer compositions of Examples 2 and 3 is increased compared to that of Example 1.

With reference to FIG. 6, it will be seen that the hot air aging properties of the vulcanizates produced in Examples 2 and 3 is similar to that in Example 1 (i.e., there is no apparent degradation of this property as a result of adding styrene polymer to the butyl polymer composition).

With reference to FIG. 7, it will be seen that the permeability to air decreased in the vulcanizates of Examples 2 and 3 when compared to the vulcanizates of Example 1 (i.e., the use of the styrene polymer additive in the present butyl polymer composition increases in the air impermeability properties of the resulting vulcanizates).

With reference to FIG. 8, it will be seen that the adhesion properties of vulcanizates of Examples 2 and 3 is increased when compared to the vulcanizate of Example 1 (as measured by the adhesion of an inner liner to the carcass of a tire).

EXAMPLES 4–14

The recipes for the bromobutyl rubber compositions used in these Examples are set out in Table 2. As will be appreciated by those of skill in the art, Example 4 contains no styrene resin and thus, this Example is provided for comparative purposes only. Examples 5–14 contain various combinations of styrene resin and extender oil.

The methodology used to mix the recipes was the same as that reported for Examples 1–3.

Figure 9:
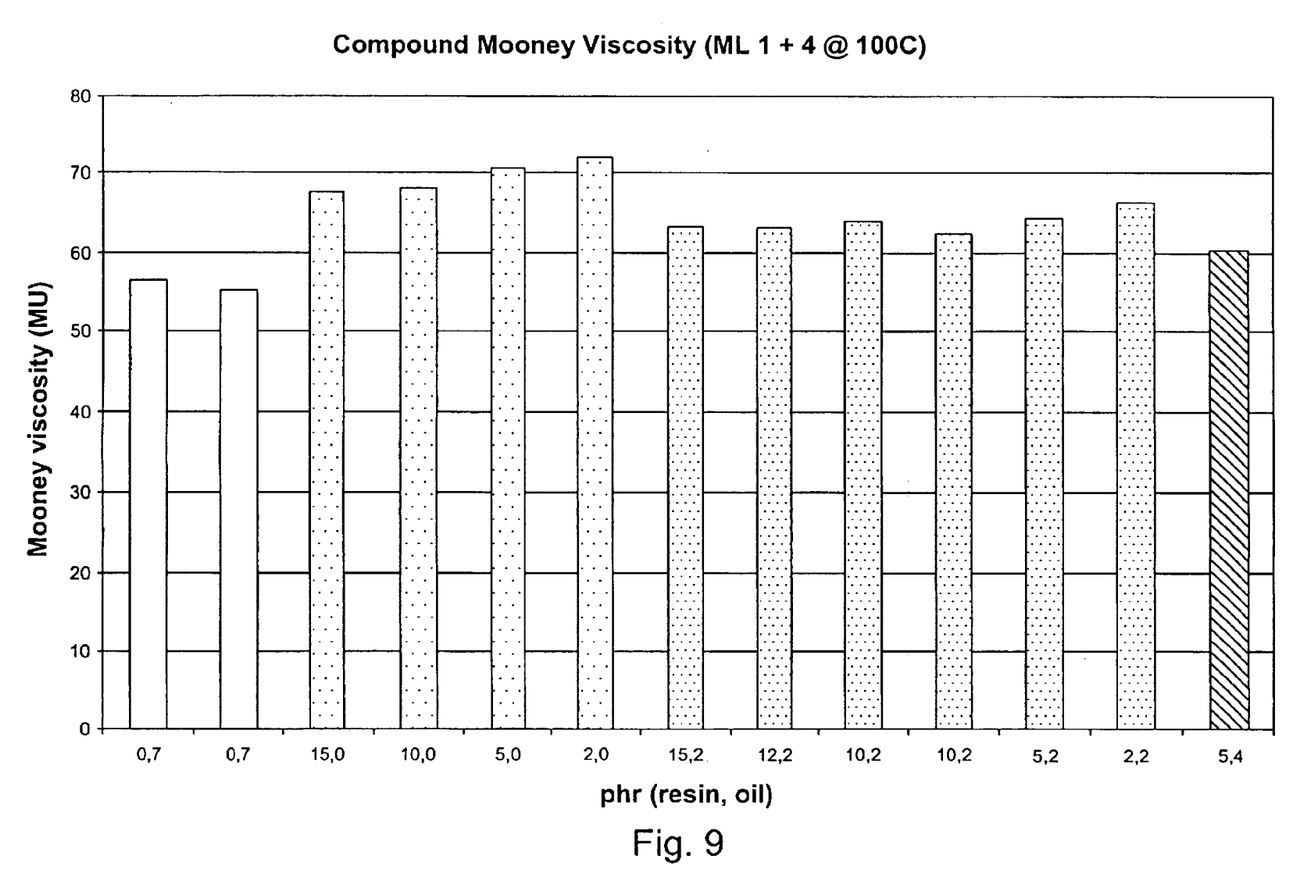
Figure 10:
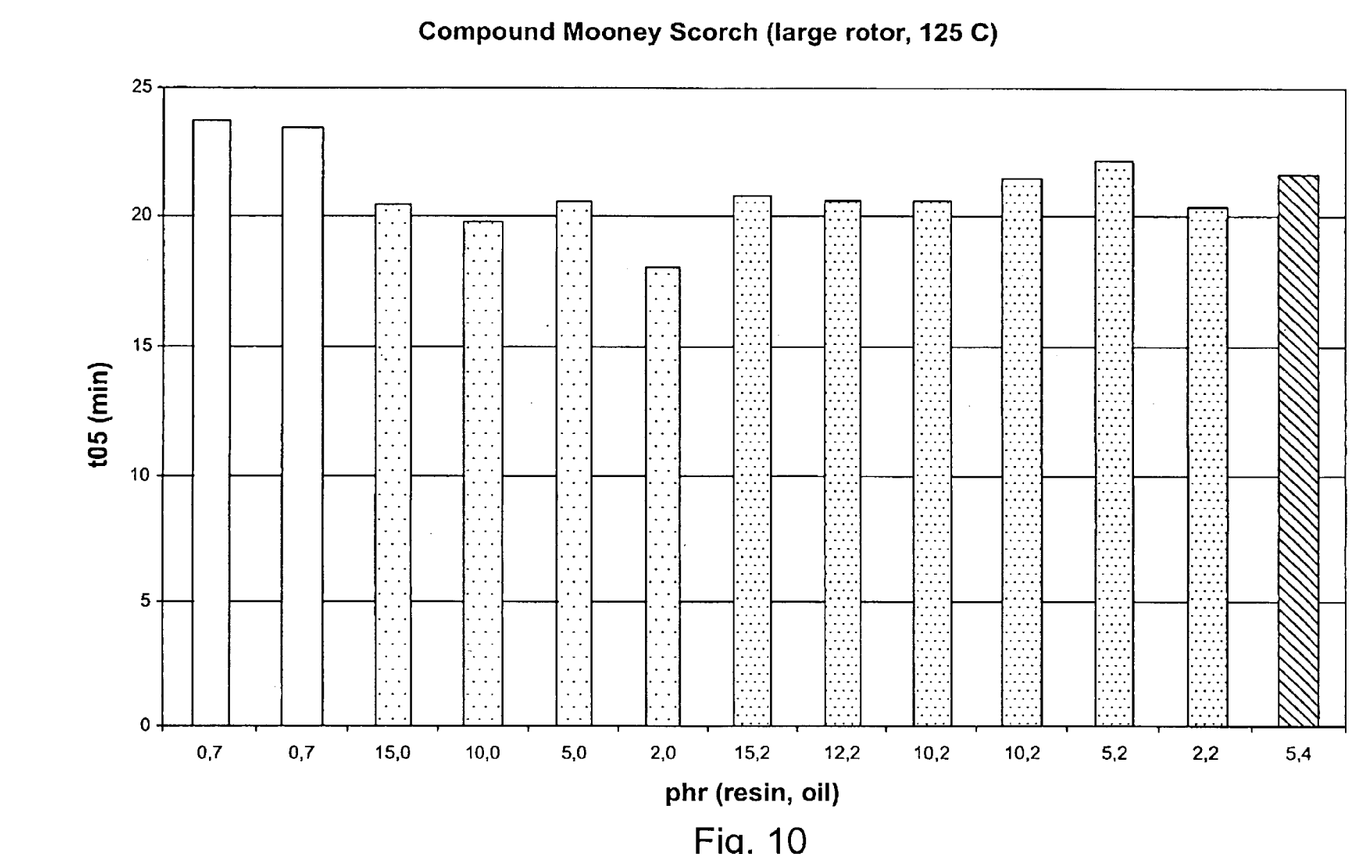
Figure 11:
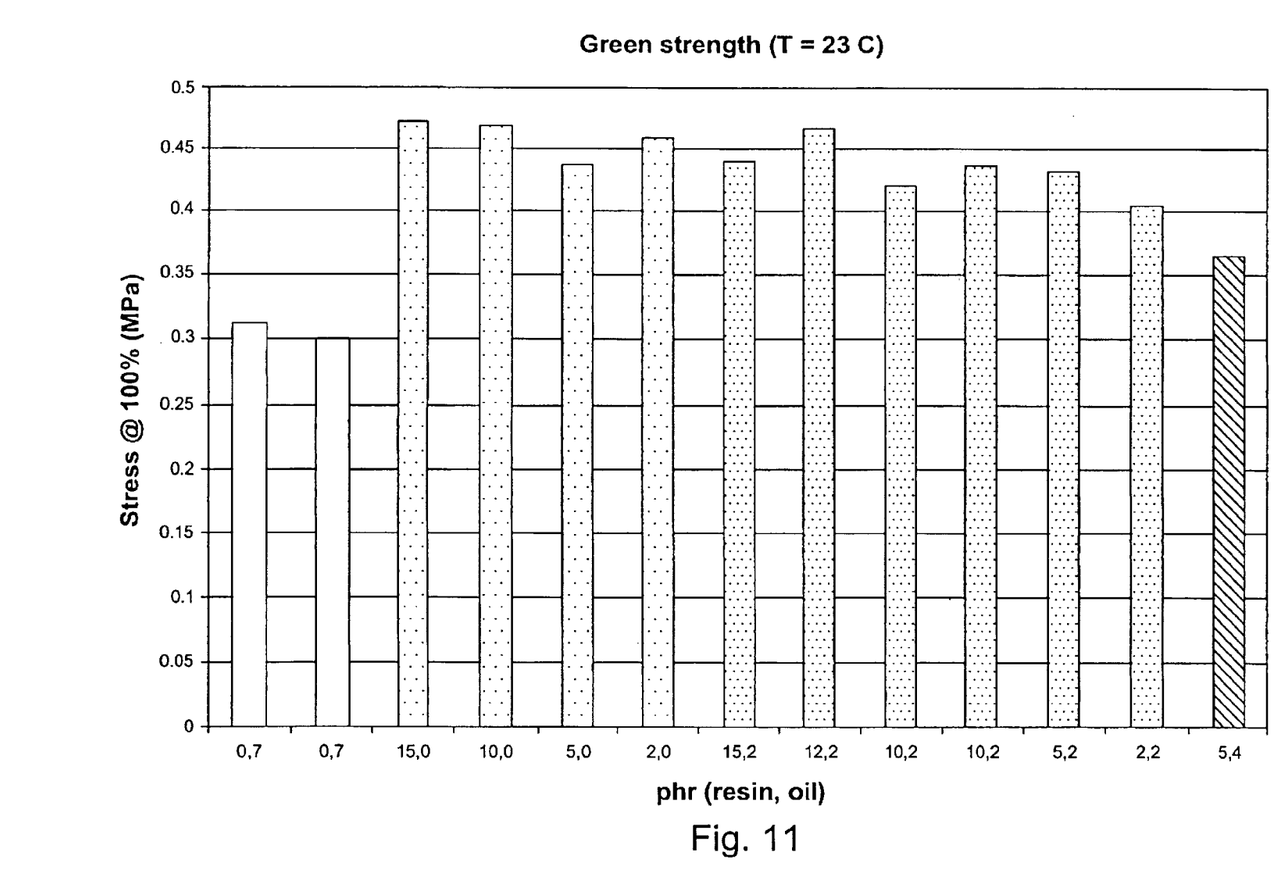

The following unvulcanized properties of the mixture were measured and the results illustrated in the Figures specified:

Compound Mooney viscosity (ML 1, 4 @ 100C.)—FIG. 9;

Compound Mooney scorch (125° C.)—FIG. 10; and

Green Strength @ 23° C.—FIG. 11.

Figure 12:
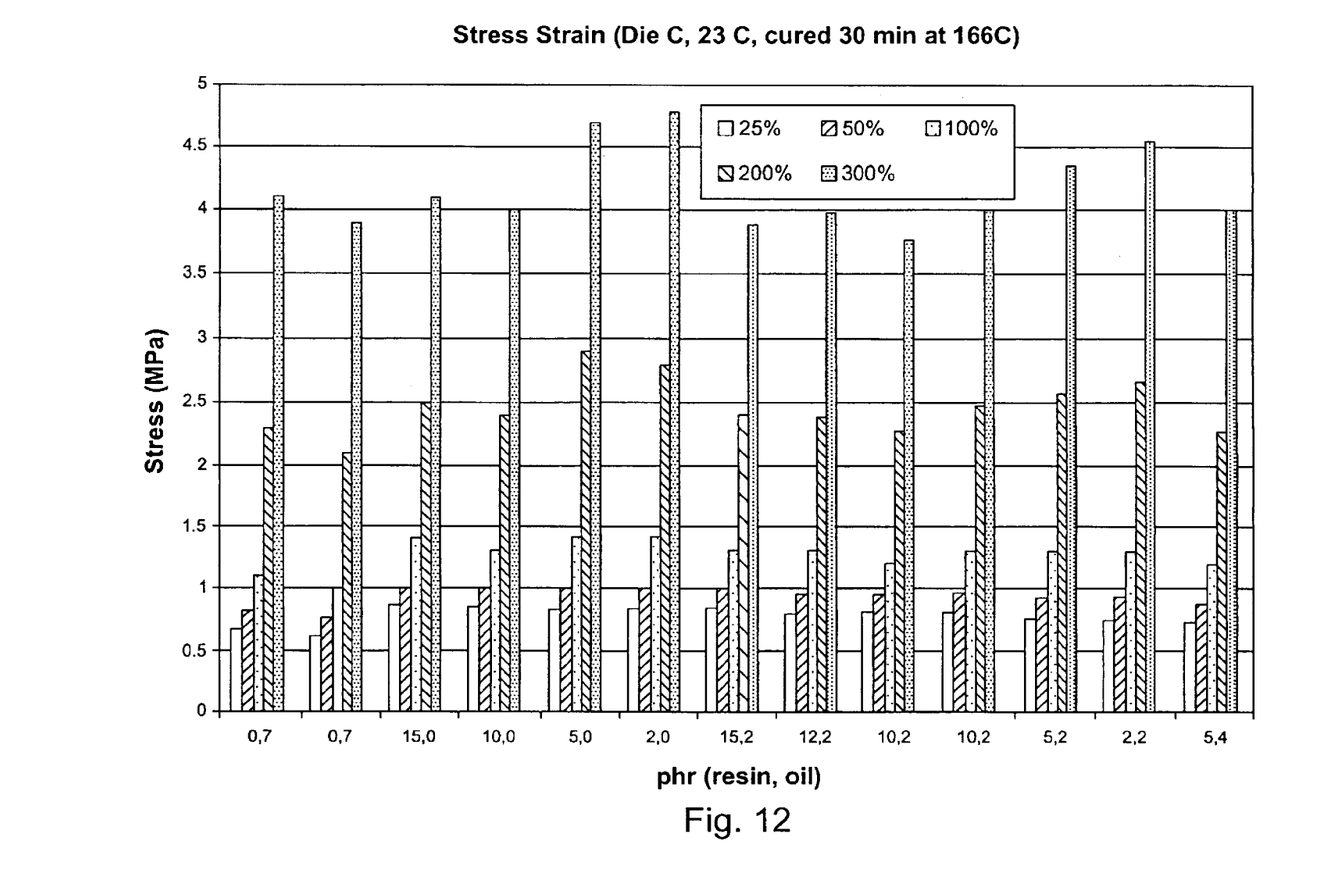
Figure 13:
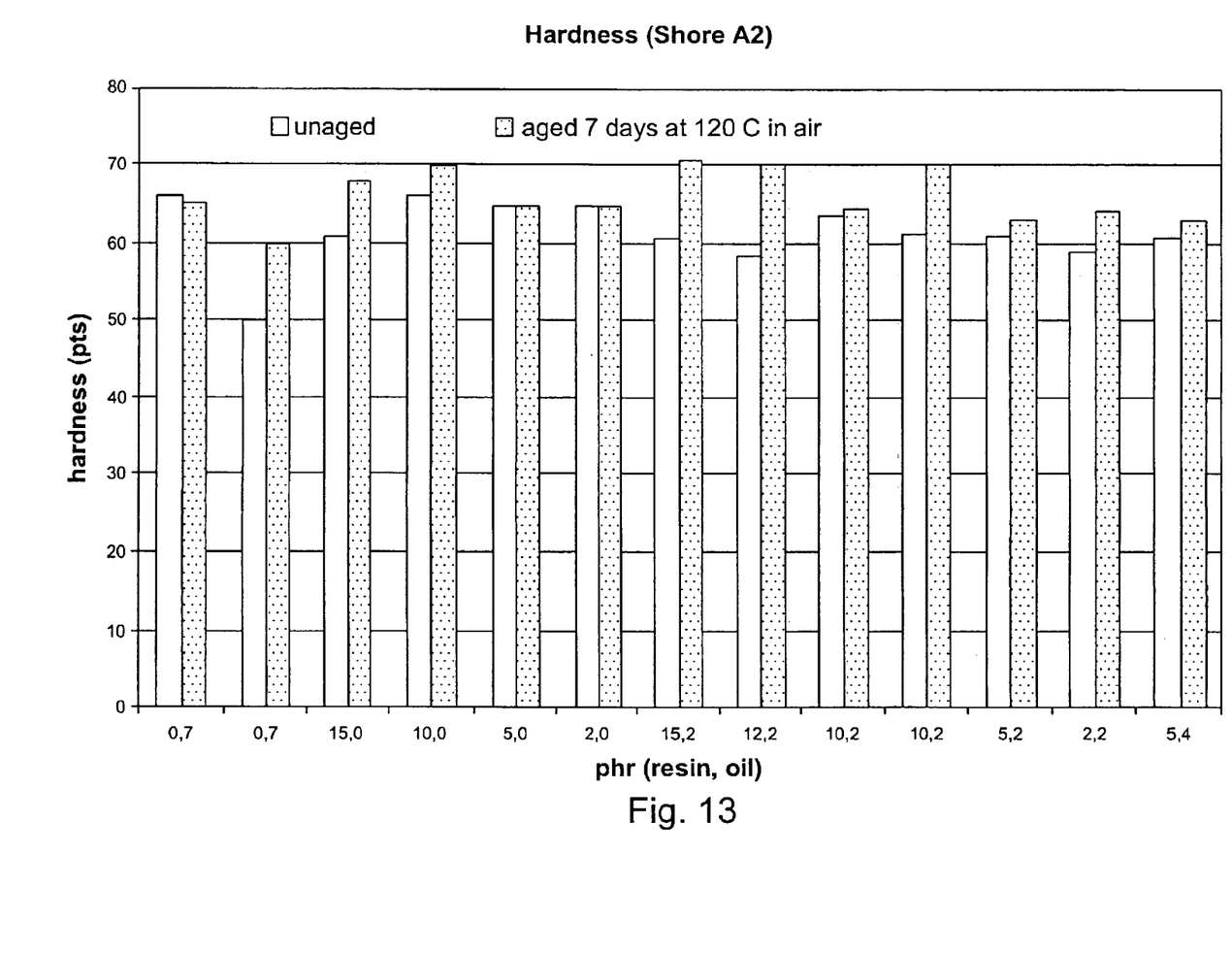
Figure 14:
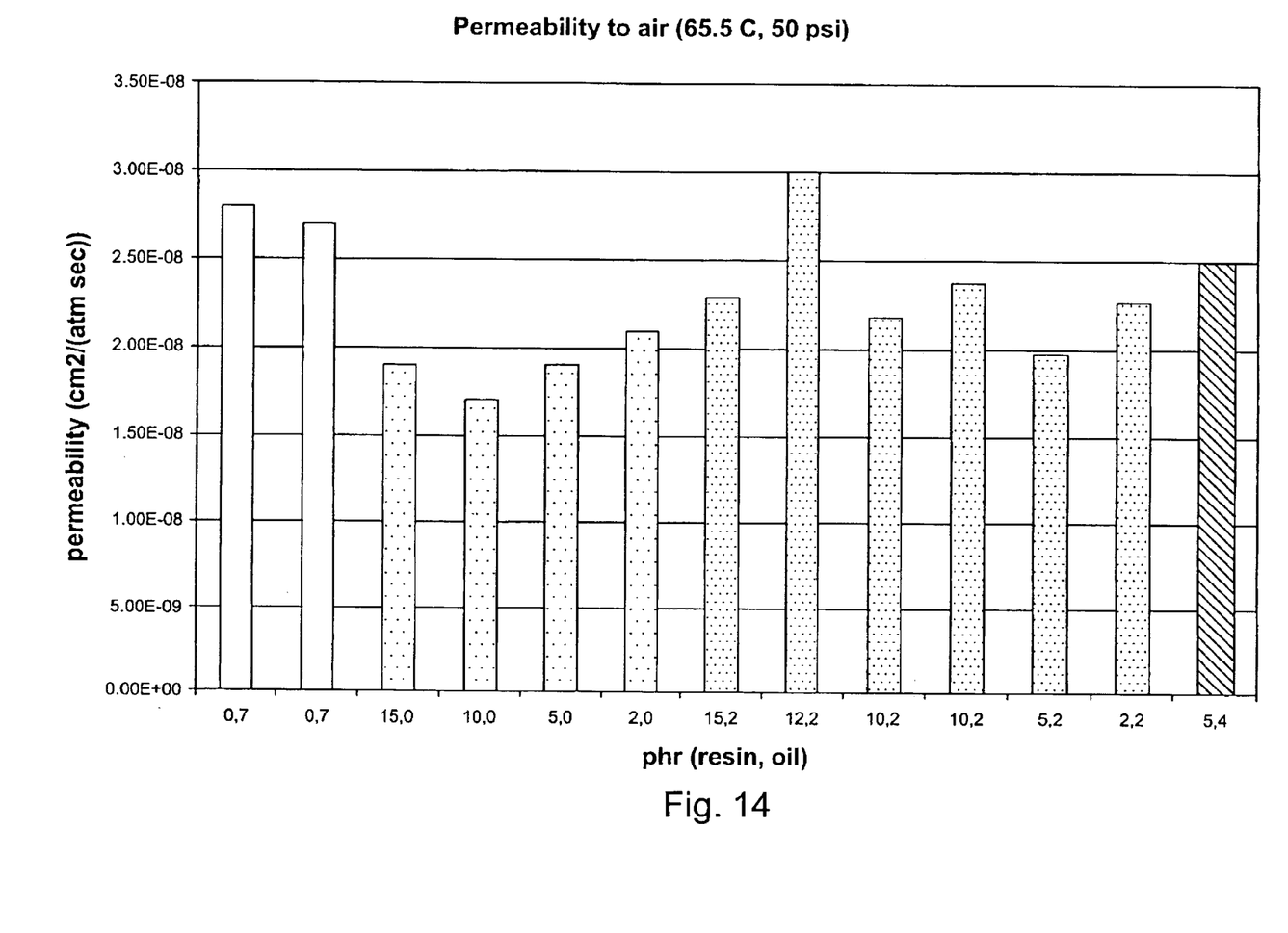

The following properties of the vulcanizate were measured and the results illustrated in the Figures specified:

Stress/Strain (Die C, test @ 23° C.)—FIG. 12,;

Hardness (Shore A)—FIG. 13; and

Permeability to air (test @ 65.5° C.)—FIG. 14.

With reference to FIG. 9, it will be seen that the combination of hydrocarbon extender oil and styrene polymer is useful in mediating the compound Mooney viscosity of the butyl rubber composition between the case where there is no styrene polymer additive and the case where there is no hydrocarbon extender oil additive.

A similar trend can be seen in FIG. 10 with reference to compounding Mooney scorch.

With reference to FIG. 11, it will be seen that an increase to 30–50% green strength is possible using 2–15 parts styrene polymer with 0–2 parts extender oil—this translates into a significant improvement in the cold flow properties of the butyl rubber composition.

With reference to FIG. 12, it will be seen that there is no significant degradation in the stress/strain profile of vulcanizates produced in Examples 5–14 compared with the vulcanizates produced in Example 4.

With reference to FIG. 13, it will be seen that the addition of the styrene polymer in Examples 5–14 did not deleteriously affect the hardness of the resulting vulcanizates compared to the vulcanizate produced in Example 4.

With reference to FIG. 14, it will be seen that the permeability to air decreased in the vulcanizates of Examples 5–14 compared to the vulcanizate of Example 4 —i.e., the use of the styrene polymer additive in the present butyl polymer composition increases the air impermeability properties of the resulting vulcanizates.

In conclusion, it can be clearly seen that a butyl polymer of the present invention has certain improved properties (such as green strength and cold flow) compared to compositions of the art with no deleterious effects on other important properties (such as permeability to air).

While this invention has been described with reference to illustrative embodiments and examples, the description is not intended to be construed in a limiting sense. Thus, various modifications of the illustrative embodiments, as well as other embodiments of the invention will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

TABLE 1

| Ingredient | Example 1 | Example 2 | Example 3 |
|---|---|---|---|
| BB 2030 | 100 | 100 | 100 |
| Sunpar 2280 | 7 | — | — |
| Kristalex ® 1120 | — | 10 | — |
| Piccotex ® 120 | — | — | 10 |
| N-660 | 60 | 60 | 60 |
| Pentalyn "A" | 4 | 4 | 4 |
| Stearic Acid | 1 | 1 | 1 |
| MBTS | 1.3 | 1.3 | 1.3 |
| Sulfur | 0.5 | 0.5 | 0.5 |
| ZnO | 3 | 3 | 3 |

TABLE 2

| Ingredient | Example | | | | | | | | | | |
| | 4 | 5 | 6 | 7 | 8 | 9 | 10 | 11 | 12 | 13 | 14 |
|---|---|---|---|---|---|---|---|---|---|---|---|
| BB 2030 | 100 | 100 | 100 | 100 | 100 | 100 | 100 | 100 | 100 | 100 | 100 |
| Sunpar 2280 | 7 | — | — | — | — | 2 | 2 | 2 | 2 | 2 | 4 |
| Kristalex ® 1120 | — | 15 | 10 | 5 | 2 | 15 | 12 | 10 | 5 | 2 | 5 |
| N-660 | 60 | 60 | 60 | 60 | 60 | 60 | 60 | 60 | 60 | 60 | 60 |

TABLE 2-continued

| Ingredient | Example | | | | | | | | | | |
|---|---|---|---|---|---|---|---|---|---|---|---|
| | 4 | 5 | 6 | 7 | 8 | 9 | 10 | 11 | 12 | 13 | 14 |
| Pentalyn "A" | 4 | 4 | 4 | 4 | 4 | 4 | 4 | 4 | 4 | 4 | 4 |
| Stearic Acid | 1 | 1 | 1 | 1 | 1 | 1 | 1 | 1 | 1 | 1 | 1 |
| MBTS | 1.3 | 1.3 | 1.3 | 1.3 | 1.3 | 1.3 | 1.3 | 1.3 | 1.3 | 1.3 | 1.3 |
| Sulfur | 0.5 | 0.5 | 0.5 | 0.5 | 0.5 | 0.5 | 0.5 | 0.5 | 0.5 | 0.5 | 0.5 |
| ZnO | 3 | 3 | 3 | 3 | 3 | 3 | 3 | 3 | 3 | 3 | 3 |

What is claimed is:

1. A method for improving the cold flow property of a butyl polymer composition comprising combining a butyl polymer and a styrene resin, wherein the styrene resin comprises a first copolymer of α-methylstyrene and a styrenic monomer, wherein the styrenic monomer is styrene, vinyl styrene, p-methylstyrene, p-chlorostyrene, p-methoxystyrene, indene, indene derivatives or mixtures thereof.

2. The method according to claim 1, wherein the butyl polymer comprises a copolymer of a $C_4$ to $C_8$ monoolefin monomer and a $C_4$ to $C_{14}$ multiolefin monomer.

3. The method according to claim 2, wherein the $C_4$ to $C_8$ monoolefin comprises an isomonoolefin.

4. The butyl method according to claim 2, wherein the monoolefin monomer is isobutylene, 2-methyl-1-butene, 3-methyl-1-butene, 2-methyl-2-butene, 4-methyl-1-pentene or mixtures thereof.

5. The method according to claim 2, wherein the $C_4$ to $C_{14}$ multiolefin comprises a $C_4$ to $C_{10}$ conjugated diolefin.

6. The method according to claim 5, wherein the conjugated diolefin is Isoprene, butadiene, 2,4-dimethylbutadiene, piperyline, 3-methyl-1,3-pentadiene, 2,4-hexadiene, 2-neopentyl-1,3-butadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinylcyclohexadiene or mixtures thereof.

7. The method according to claim 2, wherein the butyl polymer is a mixture comprising from about 70 to about 99.5 parts by weight of the $C_4$ to $C_8$ monoolefin monomer and from about 30 to about 0.5 parts by weight of the $C_4$ to $C_{14}$ multiolefin monomer.

8. The method according to claim 8, wherein the butyl polymer is a mixture comprising from about 80 to about 99.5 parts by weight of the $C_4$ to $C_8$ monoolefin monomer and from about 20 to about 0.5 parts by weight of the $C_4$ to $C_{14}$ multiolefin monomer.

9. The method according to claim 8, wherein the butyl polymer is a mixture comprising from about 97 to about 99.5 parts by weight of isobutylene monomer and from about 3 to about 0.5 parts by weight of isoprene.

10. The method according to claim 1, wherein the butyl polymer comprises a halogenated butyl polymer.

11. The method according to claim 10, wherein the halogenated butyl polymer is chlorinated.

12. The method according to claim 10, wherein the halogenated butyl polymer is brominated.

13. The method according to claim 10, wherein the halogenated butyl polymer comprises a halogen in the amount of from about 0.1 to about 8% by weight of the polymer.

14. The method according to claim 13, wherein the halogenated butyl polymer comprises a halogen in the amount of from about 0.5 to about 4% by weight of the polymer.

15. The method according to claim 14, wherein the halogenated butyl polymer comprises a halogen in the amount of from about 1.5 to about 3% by weight of the polymer.

16. The method according to claim 1, wherein the styrenic monomer is styrene, p-methylstyrene or mixtures thereof.

17. The method according to claim 16, wherein the styrenic monomer is styrene.

18. The method according to claim 1, wherein the styrenic monomer is vinyl styrene.

19. The method according to claim 1, wherein the styrene resin is combined in an amount of up to about 25 parts by weight per hundred parts by weight butyl polymer.

20. The method according to claim 19, wherein the styrene resin is combined in an amount in the range of from about 5 to about 20 parts by weight per hundred parts by weight butyl polymer.

21. The method according to claim 20, wherein the styrene resin is combined in an amount in the range of from about 5 to about 15 parts by weight per hundred parts by weight butyl polymer.

22. The method according to claim 21, wherein the styrene resin is combined in an amount in the range of from about 10 to about 15 parts by weight per hundred parts by weight butyl polymer.

23. The method according to claim 1, further comprising adding a filler.

24. The method according to claim 23, wherein the filler is carbon black, clays, titanium dioxide, silica, calcium carbonate, magnesium silicate or mixtures thereof.

25. The method according to claim 23, wherein the filler is added in an amount in the range of from about 20 to about 200 parts by weight per hundred parts by weight of butyl polymer.

26. The method according to claim 25, wherein the filler is added in an amount in the range of from about 20 to about 100 parts by weight per hundred parts by weight of butyl polymer.

27. The method according to claim 26, wherein the filler is added in an amount in the range of from about 50 to about 70 parts by weight per hundred parts by weight of butyl polymer.

* * * * *